R. H. AVERY.
Axle-Arm for Vehicle-Wheels.
No. 205,031.　　　　　　Patented June 18, 1878.
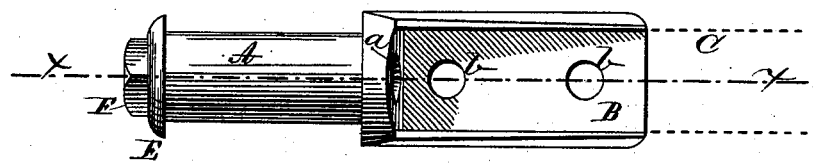
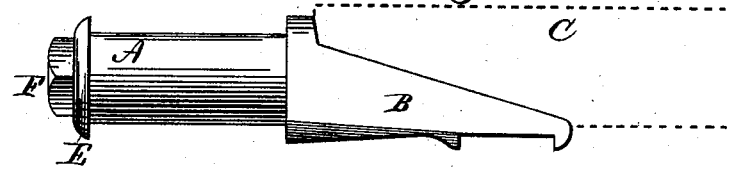
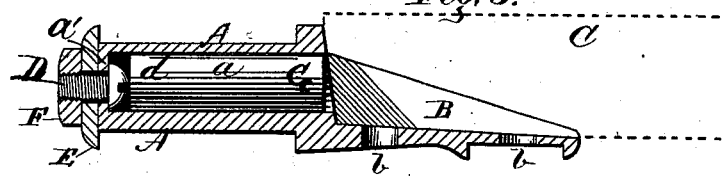
Witnesses:
M. H. Barringer
P. R. Richards
Inventor:
Robert H. Avery,
By W. P. Richards
Atty.

UNITED STATES PATENT OFFICE.

ROBERT H. AVERY, OF GALESBURG, ILLINOIS, ASSIGNOR OF ONE-HALF HIS RIGHT TO CYRUS M. AVERY, OF SAME PLACE.

IMPROVEMENT IN AXLE-ARMS FOR VEHICLE-WHEELS.

Specification forming part of Letters Patent No. 205,031, dated June 18, 1878; application filed April 28, 1877.

*To all whom it may concern:*

Be it known that I, ROBERT H. AVERY, of Galesburg, in the county of Knox and State Illinois, have invented certain new and useful Improvements in Wheel-Journals; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to improvements in cast-metal wheel-journals, hereinafter fully described, and set forth in the claims hereto annexed.

In the accompanying drawings, Figure 1 is a top view of the journal end of an axle embodying my invention. Fig. 2 is a side elevation. Fig. 3 is a sectional view in the line $xx$ in Fig. 1.

Referring to the parts by letters, A represents the journal end or arm of a cast-metal axle, and has a projecting portion, B, with holes $b$, through which it may be bolted to a wooden axle or frame, C. The arm A has a central opening, $a$, through it, at the outer end of which is an inwardly-projecting annular flange, $a'$. D is a stud-bolt, its outer end threaded and its inner end having a head, $d$. The bolt D is inserted through the opening $a$, with its head resting against the flange $a'$ and its threaded end projecting outward for the reception of a washer, E, which projects sufficiently to hold the wheel in place on the journal A. F is a nut screwed upon the outer end of the bolt D, for securing the washer E. G is a wooden plug, which may be used to press the bolt D out to its place when the nut F is to be screwed on.

The bolt D may be square in its cross-section where it seats in the flange $a'$, or otherwise held in any ordinary manner from turning while the nut F is screwed into place.

The herein-described method of securing the nut F in place adds to the strength and durability of the attachment, the advantages arising from easy removal of the old bolts D when worn and substituting new ones, and the advantages of a tubular axle.

Having thus described my invention, what I claim as new, and desire to secure by Letters Patent, is—

In combination with hollow-axle journal A, having inwardly-extending flange $a'$, removable nut F and bolt D, the head of said bolt being adapted to engage with said flange, substantially as set forth.

In testimony that I claim the foregoing as my own I affix my signature in presence of two witnesses.

ROBERT H. AVERY.

Witnesses:
W. H. PAGE,
THOS. C. MAGOFFIN.